Patented June 26, 1951

2,558,666

UNITED STATES PATENT OFFICE 2,558,666

NITRILE DERIVATIVES

Robert J. Vander Wal, Chicago, Ill., assignor to Armour and Company, Chicago, Ill., a corporation of Illinois No Drawing. Application December 17, 1947, Serial No. 792,353

17 Claims. (Cl. 260—404)

This invention relates to nitrile derivatives and more particularly to derivatives of the fatty acid nitriles. The invention deals specifically with hydroxy fatty acid nitriles and esters thereof and the processes of making the same.

Fatty acid nitriles are desirable materials for a number of commercial uses. They are valuable as intermediates for the preparation of reagents in the separation of ores, as plasticizing agents in the manufacture of synthetic rubber and other plastic compositions and for many other uses.

The fatty acid nitriles are commercially made by the reaction of fatty acids and ammonia, the fatty acids for the reaction being obtained through hydrolysis of a natural oil or fat such as linseed oil, soya bean oil, lard, tallow, etc.

An object of the present invention is to provide further derivative products of the fatty acid nitriles other than has heretofore been available, which derivative products have characteristics making them valuable for commercial uses. The invention also deals with processes by which such further derivative products may be prepared.

I have discovered a family of compounds which may be derived from the fatty acid nitriles now commercially available and which have added valuable characteristics not associated with the nitriles from which they are prepared.

One series of these nitriles is characterized by the presence of hydroxyl groups attached to the carbon chain, and may be called hydroxy nitriles.

I have further discovered that such hydroxy nitriles may be easily prepared by processes which include reacting the fatty acid nitriles with sulfuric acid under controlled conditions to prepare sulfated nitriles and then hydrolyzing the sulfated nitriles so formed to prepare the hydroxy nitriles.

It has previously been known that hydrocarbons and fatty acids may be hydroxylated by reacting the same with sulfuric acid and then hydrolyzing. But the structure of nitriles differs markedly from such compounds in that it contains the highly reactive —C≡N group, and if it were to be considered by those familiar with this art, it would normally be thought that a reaction between the sulfuric acid and the fatty acid nitrile would take place at the nitrogen end of the molecule. However, I have found that by using moderately low temperatures the sulfuric acid may be reacted with the unsaturated nitrile to add a sulfate group at a carbon atom within the carbon chain and without destruction or alteration of the —C≡N group. The sulfates so formed are actually sulfuric esters and may be called oxygen-linked esters and are in themselves new and valuable materials which are superior to the original fatty nitriles for many applications. They can be hydrolyzed to form the hydroxy nitriles.

Furthermore, I find that the hydroxy nitriles so prepared may be esterified with organic acids or acid halides to produce further new derivatives having valuable properties.

As a starting material I can use any high molecular weight fatty acid nitrile material containing high molecular weight unsaturated nitriles. Advantageously, I can use nitriles prepared from fatty acids obtained from the natural fats and oils such as the mixed acids of linseed oil, soya bean oil, fish oil, olive oil, oleostearine, tallow, cottonseed oil, maize, lard, tall oil, etc. It is better to use a nitrile material prepared from a fatty acid source having a high proportion of unsaturated acids. An efficient practice is to subject the acid mixtures obtained upon hydrolysis of the natural oils to a fractionation procedure as by distillation or crystallization to obtain a fraction containing a higher proportion of unsaturated acids than the original mixture and use this fraction in the preparation of nitriles from which derivatives are to be made.

Another practice is to prepare nitriles from a natural acid mixture and then subject the nitriles to fractionation to obtain a fraction containing a high proportion of unsaturated nitriles.

By the term "unsaturated nitriles" I mean to designate those nitriles having unsaturation within their carbon chains. The principal unsaturated nitriles derived from natural fatty sources have from 18 to about 26 carbon atoms, the longer chain length acids being obtained from fish oils such as sardine or menhaden oil. The nitriles employed in my process are of high molecular weight, usually having about 18 carbon atoms. Specific examples of nitriles which may be used in the practice of my invention are eicosenenitrile, docosenenitrile, tetracosenenitrile, octadecadienenitrile, etc.

In a preferred method of preparing my compounds, concentrated sulfuric acid is added slowly at low temperatures to, for example, a quantity of the nitriles of red oil fatty acids, of which oleic acid constitutes the major part. The sulfuric acid adds to the double bond between the ninth and tenth carbon atoms of the nitrile of oleic acid, and the resulting product is a stearonitrile with a sulfate group attached at the ninth or tenth carbon atom. This sulfate is then purified and hydrolyzed to form the desired hydroxy nitrile, with the hydroxy group attached at the ninth or tenth carbon atom.

The nitrile material is reacted with sulfuric acid, observing caution so as to avoid disturbance of the —C≡N group of the molecule. One precaution involves holding the reactants at a rather low temperature, and this is facilitated by adding the sulfuric acid solution slowly to the nitrile. It is desirable to maintain the temperature of reaction below 25° C. and preferably between 5 and 10° C. Temperatures as low as 0° C. and lower may be employed, it being necessary only to avoid temperatures so low that the reactants cannot be stirred. In general, higher temperatures may be tolerated if the sulfuric acid solution is more dilute. I prefer to use a fairly dilute sulfuric acid solution such as 90 to 95%. After the sulfate of the unsaturated nitriles has been formed, this may be hydrolyzed by boiling with water to prepare the hydroxy nitriles.

The inorganic acid used in my process which forms the fatty acid nitrile-acid compound is not necessarily confined to sulfuric acid. Other acids having an affinity for the double bond of the fatty compounds disclosed may also be used. I prefer, however, to use sulfuric acid because of the relative ease with which the reaction proceeds.

However, the nitrile material used in the sulfating reaction is usually not wholly pure unsaturated nitriles and in practice it is usually necessary to remove the unreacted portion. It is possible to proceed with the hydrolysis step and then separate the unreacted portion by distillation. I prefer to remove unreacted products by treating the sulfated nitriles prior to hydrolysis and then finish the purification by distillation.

A preferred treatment involves converting the sulfate to a water-soluble salt and heating the mixture to about the boiling point in aqueous solution. This causes unreacted constituents to separate from the sulfate salt, and the aqueous phase may be acidified to recover the separated sulfuric acid derivatives.

If desired, the mixture, either before or after, preferably after, the conversion to the water-soluble sulfate salt, may be washed in sodium chloride solution to remove acids and other constituents soluble in such solution.

Another method of purification involves extracting a water solution of the water-soluble salt of the sulfated nitrile with a hydrocarbon solvent or a chlorinated hydrocarbon solvent to remove unreacted nitriles. The nitrile sulfate salt so prepared may then be acidified to produce the free sulfated nitrile, and this may be hydrolyzed to obtain the hydroxy nitriles. If desired, this method of purification may be employed in connection with the purification steps above described.

I have found that the hydroxy nitriles prepared as above explained have very desirable qualities. They may be used, for example, as intermediates for the preparation of wetting agents, as emulsifying agents or mordants for dyes. Since they function both as a nitrile and an alcohol they can be adapted to many purposes for which the nitriles themselves are not indicated.

Further derivatives may be prepared by esterification of the hydroxyl group with acids, acid chlorides or acid anhydrides which process results in cyanoesters. Thus, the hydroxyl group may be esterified with acetyl chloride, acetic anhydride, benzoyl chloride, stearoyl or oleoyl chlorides, phthalic anhydride, azelaic acid and many other acid, acid halides, or anhydrides. Thus, for example, the 9- or 10-hydroxy stearonitrile produced from the nitriles of red oil fatty acids, as described above, may be esterified with, for example, acetic acid, oleic acid, etc., to form the acetic, oleic, etc., acid esters of 9- or 10-hydroxy stearonitrile. Such esters are linked by oxygen at the original point of attachment of the hydroxyl group, and may be called oxygen linked esters.

As I have already indicated in connection with the purification of the sulfated nitriles, it is possible to react the sulfated nitriles with basic substances such as alkali hydroxides or organic bases such as organic amines or organic amino derivatives. The products are generally water-soluble and have been found to possess surface active properties.

Some specific examples of the method of preparation of the compounds which I have disclosed are as follows:

*Example 1*

A solution of 200 cc. of concentrated sulfuric acid and 30 cc. of water is added slowly with stirring to 530 gms. of the nitriles of red oil fatty acids. The temperature is held at 0° C. to −10° C. and stirring is continued for 2 hours within the same temperature range. The oily product is poured into cold water, stirred, and the oil allowed to separate. The oil is then poured into fresh water and made strongly alkaline with sodium hydroxide. The sodium salt is salted out with sodium chloride. The resulting oil is then extracted with carbon tetrachloride. The residual oil is then boiled with dilute sulfuric acid and the resultant oil contains the hydroxy nitriles. The crude oil is washed, stirred with calcium hydroxide, filtered and distilled to separate the hydroxy nitriles from solution.

*Example 2*

A solution of 200 cc. concentrated sulfuric acid and 30 cc. water is added slowly at −10 to −15° C. to 530 gms. of the nitriles of red oil acids. Provision is made to prevent the condensation of moisture in the vessel. Stirring is continued within the same temperature range for about two hours more. The oil is then poured into one liter of water and boiled. The resultant oil is stirred with calcium hydroxide, filtered and distilled.

*Example 3*

To 1052 gms. of a mixture of cottonseed and soya bean oil fatty acid nitriles having an iodine value of 80.9 was added a mixture of 700 gms. of concentrated sulfuric acid and 57 cc. of water while constantly stirring. The temperature was maintained at +5 to +10° C. during the whole addition period and the mixture was kept stirring for ½ hour after the final addition of ingredients. The whole mix was then poured into cold water and stirred well. Since it did not separate quickly, it was made ammoniacal with aqueous ammonia without separation; (1000 cc. of 29% ammonia) were used. Some oil separated at room temperature which was separated and extracted again with water. The water was added to the main solution. Upon heating to boiling more oil (250 cc.) separated. This oil was found to be insoluble. The aqueous solution was boiled with 200 cc. concentrated $H_2SO_4$, the separated oil washed by shaking with water and once by boiling with water, and then stirred with $Ca(OH)_2$ and filtered.

The oil was distilled in a short Vigreau column. An attempt was made to make a cut roughly at the boiling point of hydroxy nitriles. The distillation was continued until the product stopped distilling. Yield: 165 gms.

*Example 4*

To 530 gms. of distilled tall oil fatty acid nitriles was added a mixture of 200 cc. of H₂SO₄ and 30 cc. of water while stirring. The temperature was held at −5 to +5° C. for a total of 4 hours, including mixing time. The mixture was washed with 2 liters of cold salt water. The oil was poured into a solution of 55 gms. of NaOH in 2 liters of water. The mixture was stirred and the oil salted out. The oil was then shaken with 2 liters of hot water in which some of the oil was not soluble. This was separated and discarded. 100 cc. of H₂SO₄ was added to the aqueous portion and boiled well. The precipitated oil was washed with hot water, stirred with lime and filtered. Yield 208 gms. of oil consisting mostly of hydroxystearonitrile.

*Example 5*

To 530 gms. of distilled tall oil nitriles was slowly added a mixture of 200 cc. of concentrated H₂SO₄ and 30 cc. of water at −5° C. to 0° C. Stirred about 15 minutes after the final addition and poured into 2 liters cold water. Shook well and separated. Washed oil with NaCl solution and then added the washed oil to 2 liters of NaOH solution containing 55 gms. HaOH. Heated and salted out the oil. Then dissolved as much oil as possible in 2 liters of water and again salted with NaCl to produce a light yellowish brown oil consisting mainly of the sodium salt of the sulfated stearonitrile. Yield: 330 gms.

*Example 6*

20 parts of a mixture of 9-hydroxy stearonitrile and 10-hydroxy stearonitrile and 8 parts of pyridine may be mixed and cooled, and 25 parts of oleoyl chloride slowly added. The temperature may be held below 15° C. for one hour and then allowed to rise to room temperature. After two days at room temperature the product may be dissolved in ether, the solution washed several times with a dilute aqueous solution of sulfuric acid and the acid washed out with dilute potassium carbonate solution. The product may be recovered by evaporation of the ether.

*Example 7*

To 500 gms. of a mixture of 9-hydroxy stearonitrile and 10-hydroxystearonitrile was added 300 cc. of acetic anhydride. The mixture was refluxed for three hours. Distilled off the excess acetic anhydride and washed the remaining product with water. Its saponification number was 92.9.

Although the invention has been described in connection with certain specific examples, it will be apparent that many modifications and changes may be made without departing from the spirit and scope of the invention.

This application is a continuation in part of my co-pending application, Serial No. 536,617, filed May 20, 1944, now abandoned.

I claim:

1. An uninterrupted straight chain aliphatic nitrile of at least 18 carbon atoms, selected from the group consisting of

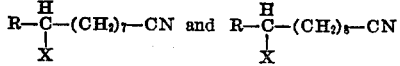

where R is an aliphatic hydrocarbon radical and X is an oxygen-linked ester radical.

2. An uninterrupted straight chain aliphatic nitrile of at least 18 carbon atoms, having an oxygen-linked ester radical attached to the ninth carbon atom.

3. An uninterrupted straight chain aliphatic nitrile of at least 18 carbon atoms, having an oxygen-linked ester radical attached to the tenth carbon atom.

4. 9-hydroxy stearonitrile.

5. 10-hydroxy stearonitrile.

6. A sulfate of stearonitrile in which the sulfate group is attached to the ninth carbon atom.

7. A sulfate of stearonitrile in which the sulfate group is attached to the tenth carbon atom.

8. The oleoyl ester of 9-hydroxy stearonitrile.

9. A process of hydroxylating at the double bond of an unsaturated nitrile having at least 18 carbon atoms and having a double bond between the ninth and tenth carbon atoms, comprising reacting the unsaturated nitrile with sulfuric acid below about 25° C. to form a sulfate thereof and thereafter hydrolyzing the sulfate.

10. The process of hydroxylating at the double bond of an unsaturated nitrile having at least 18 carbon atoms and having a double bond between the ninth and tenth carbon atoms, comprising reacting the nitrile with sulfuric acid at a low temperature below about 25° C. to form a sulfate, converting the sulfate to the corresponding water soluble salt, dissolving the salt in water, extracting the aqueous solution with a water-immiscible organic solvent for unreacted nitrile, acidifying the aqueous solution, and then hydrolyzing the sulfate to convert it to a hydroxylated nitrile.

11. The process as in claim 10 wherein the temperature during reaction with sulfuric acid is about 5 to 10° C.

12. An uninterrupted straight chain aliphatic nitrile of at least 18 carbon atoms, selected from the group consisting of

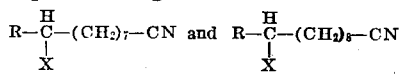

where R is an aliphatic hydrocarbon radical and X is a sulfate salt radical.

13. An uninterrupted straight chain aliphatic nitrile of at least 18 carbon atoms, having a sulfate salt radical attached to the ninth carbon atom.

14. An uninterrupted straight chain aliphatic nitrile of at least 18 carbon atoms having a sulfate salt radical attached to the tenth carbon atom.

15. A sodium salt of the sulfate of stearonitrile in which the sulfate group is attached to the ninth carbon atom.

16. A sodium salt of the sulfate of stearonitrile in which the sulfate group is attached to the tenth carbon atom.

17. An uninterrupted straight chain aliphatic nitrile of at least 18 carbon atoms, selected from the group consisting of

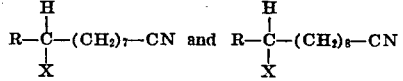

where R is an aliphatic hydrocarbon radical.

ROBERT J. VANDER WAL.

REFERENCES CITED

The following references are of record in the file of this patent:

UNITED STATES PATENTS

| Number | Name | Date |
|---|---|---|
| 1,947,673 | Bertsch | Feb. 20, 1934 |
| 2,229,649 | Guenther et al. | Jan. 28, 1941 |

OTHER REFERENCES

Chuit et al. Beilstein (Handbuch, 4th Ed. 2nd Suppl. 1942) vol. 3 pp. 243, 245, 246.

Chem. Abstracts V. 26, p. 698⁴ by Verhulst.